United States Patent
Sayles et al.

(10) Patent No.: US 6,616,336 B1
(45) Date of Patent: Sep. 9, 2003

(54) LUBRICATION SYSTEM

(76) Inventors: Richard Stanley Sayles, Suffolk (GB); Eustathios Ionnides, Zeist (NL)

( * ) Notice: Subject to any disclaimer, the term of this patent is extended or adjusted under 35 U.S.C. 154(b) by 0 days.

(21) Appl. No.: 09/719,213

(22) PCT Filed: Jun. 15, 1999

(86) PCT No.: PCT/NL99/00372
§ 371 (c)(1),
(2), (4) Date: Jan. 22, 2001

(87) PCT Pub. No.: WO99/66222
PCT Pub. Date: Dec. 23, 1999

(30) Foreign Application Priority Data

Jun. 15, 1998 (NL) .............................................. 1009410

(51) Int. Cl.[7] .............................................. F16C 19/00
(52) U.S. Cl. ........................ 384/462; 384/300; 384/463
(58) Field of Search ................................. 384/462, 300, 384/470, 463, 523, 526, 528, 527, 530, 902, 465, 492, 108

(56) References Cited

U.S. PATENT DOCUMENTS

| | | | |
|---|---|---|---|
| 4,525,286 A | * | 6/1985 | Reick .......................... 508/138 |
| 4,941,987 A | * | 7/1990 | Strepparola et al. ......... 508/128 |
| 5,529,401 A | * | 6/1996 | Gabelli et al. ............... 384/463 |
| 5,707,718 A | * | 1/1998 | Matsukawa et al. ......... 384/108 |
| 5,741,762 A | * | 4/1998 | Kahlman ..................... 384/492 |
| 6,228,813 B1 | * | 5/2001 | Yabe et al. .................. 384/463 |
| 6,265,362 B1 | * | 7/2001 | Loderer et al. .............. 508/485 |

FOREIGN PATENT DOCUMENTS

| | | |
|---|---|---|
| CH | 683 479 G | 3/1994 |
| EP | 0 654 613 | 5/1995 |
| EP | 0930445 A1 * | 7/1999 |
| GB | 1 396 220 | 6/1975 |
| JP | 60-124697 | 7/1985 |
| RU | 2059919 | 5/1996 |

OTHER PUBLICATIONS

Research Disclosure, RD–406003 A, Anonymous, Feb. 10, 1998, No. 405.*

* cited by examiner

*Primary Examiner*—Christopher P. Schwartz
*Assistant Examiner*—Melanie Torres

(57) ABSTRACT

A lubrication system for mutually displaceable bodies of a mechanical device, comprises a porous element and a lubricating liquid (11) comprising dispersed particles (12), the size of the pores (10) of the porous element, and the size of the particles (12) being selected such that the pores (10) of the porous element become blocked by the particles contained in the lubricant liquid film (11) in the area of contact of said porous element with one of the bodies.

3 Claims, 2 Drawing Sheets

LUBRICATION SYSTEM

The invention is related to the field of lubrication of a mechanical device having bodies which are displaceable with respect to one another. Such mechanical device may take several forms; as an example, a rolling element bearing is mentioned. However, the invention is not limited to such device. Other examples include hinged devices and sliding devices.

In said devices, lubrication is applied in order to obtain a smooth behaviour with less friction of the mutually displaceable bodies. Also, it is envisaged to limit wear in this way.

In order to obtain a proper lubrication, it is important to ensure that a thin film of lubrication liquid is formed and maintained in the contact area between the bodies. The formation of such film depends i.a. on the behaviour of the lubrication liquid with respect to pressures, the size and shape of the contact surfaces of the bodies, etcetera.

Once the film is destroyed, e.g. due to exposure to extreme pressures accompanied by a leakage, a direct contact of the bodies is obtained which has a negative influence on the friction and wear.

In the case of a porous material saturated with a viscous liquid, bouncing against the face of a moving body, the interface viscous shear forces deplete the surface region of the porous material quicker than the porous material could replenish the interface. This results in an evacuated surface region that collapses elastically and prevents further flow from the pores of the material. Removal of the load, or the sliding shear, allows the porous interface region to elastically recover and replenish itself with fluid from within the hinterland of the porous material.

The object of the invention is therefore to provide for an improved lubrication, whereby a proper lubricant film can be maintained between two bodies, also under extreme conditions. This object is achieved by means of a lubrication system for mutually displaceable bodies of a mechanical device, said system comprising a porous element and a lubricating liquid comprising dispersed particles, the size of the pores of the porous element, and the size of the particles being selected such that the pores of the porous element become blocked by the particles contained in the lubricant liquid film in the area of contact of said porous element with one of the bodies.

In the lubrication system according to the invention, the porous material represents a reservoir thus allowing to maintain an appreciable amount of lubrication liquid in the vicinity of the contact area between the bodies, which lubricating liquid may escape freely from the pores. On the other hand, the system enhances the formation of a lubricant squeeze film as soon as one of the bodies approaches or bounces into the porous material. This is caused by the fact that the pores in the porous element become temporarily blocked by the particles dispersed in the lubricant. Said lubricant then can no longer escape via the pores, and forms a squeeze film in the contact area of those bodies.

The use of particles as a secondary phase in a base lubricant, will enhance the possibility of maintaining a film under squeeze (high pressure gradient) conditions.

In particular, platelet like particles can be applied which have a maximum diameter engineered to be larger than the bearing's pore size, and which will align themselves in the film flow direction, but will tend to obstruct the flow of lubricant into the pores under squeeze load induced pressure gradients (film pressure>pore pressure). When the pressure gradient is reversed the particles would tend to leave the surface and allow the porous bearing surface to release lubricant into the film.

Furthermore, the porous material can be engineered such that its effective pore size increases toward the film boundary. In that connection, a particle size can be employed that will enter the pores at this boundary, but will not pass through the porous media under a loading pressure gradient. Under a reversed pressure gradient, reverse flow will aid the release of particles back into the film.

Having regard to the properties of elastic porous media, as described earlier, and the viscous forces in the film which deplete the near surface layers under thin-film high shear-rate conditions, thus causing elastic deformation/collapse, the effective pore size is reduced such that secondary phase particles are trapped in the surface region rendering the surface layers impervious. When loads are removed, the reverse pressure gradient and the elastic recovery of the surface layers/region allow the particles and lubricant to pass back into the film.

In general, a sufficiently low modulus of elasticity is required to allow deformation of the passages for the operating pressure gradient.

In essence, particles will be engineered to match film thickness conditions and bearing material pore size and structure, to exploit the combination, in a form of micro non-return valve principle, that can enhance lubrication under dynamic load conditions.

Such lubrication system resembles the human spherical joints (e.g. knee) where the long proteins in the synovial fluid block the fibrous channels into the cartilage, thus creating a squeeze film during the approach of the contacting surfaces as the joint gets loaded (e.g. standing). Upon release the channels get "unplugged", and lubricating fluid is released.

Analogously, once the bodies in question move away from one another, the pores are freed and oil is subsequently released.

The size of the particles may be larger than the size of the pores. Moreover, the porous material should be wettable by the lubricating liquid.

Preferably, the lubrication liquid is an oil comprising PTFE particles.

According to a particular preferred embodiment of the system according to the invention, one of the bodies is a cage for a rolling element bearing, said cage having pockets defined by a porous material, and the other body is a rolling element of said bearing and contained in such pocket.

In the case of rolling element bearings there is also a significant potential further advantage offered from using the porous cage as a lubricant supply to the raceway contacts. Such contacts, particularly at high speeds, often run partially starved due to adverse geometry and the continuous passage of rolling elements expelling lubricant from the tracks, and there not being sufficient time to replenish them with new lubricant prior to the next overolling encounter. Rolling elements continually oscillate in the cage pockets and thus provide the dynamic load environment that is needed to exploit the porous material as a possible lubricant source, and at an ideal place to satisfy the raceway contact needs.

Two additional areas where benefits are envisaged are; big-end bearings, particularly in large marine engines where inertial forces are relatively high; and the cage-sphere interfaces in constant velocity ball joints. Improvements in the lubrication of such devices would offer significant advantages in terms of reducing frictional losses and improving efficiency, that could lead to higher performance ratings and energy savings.

The invention will be described further with reference to an embodiment shown in the figure's.

Figure 1:
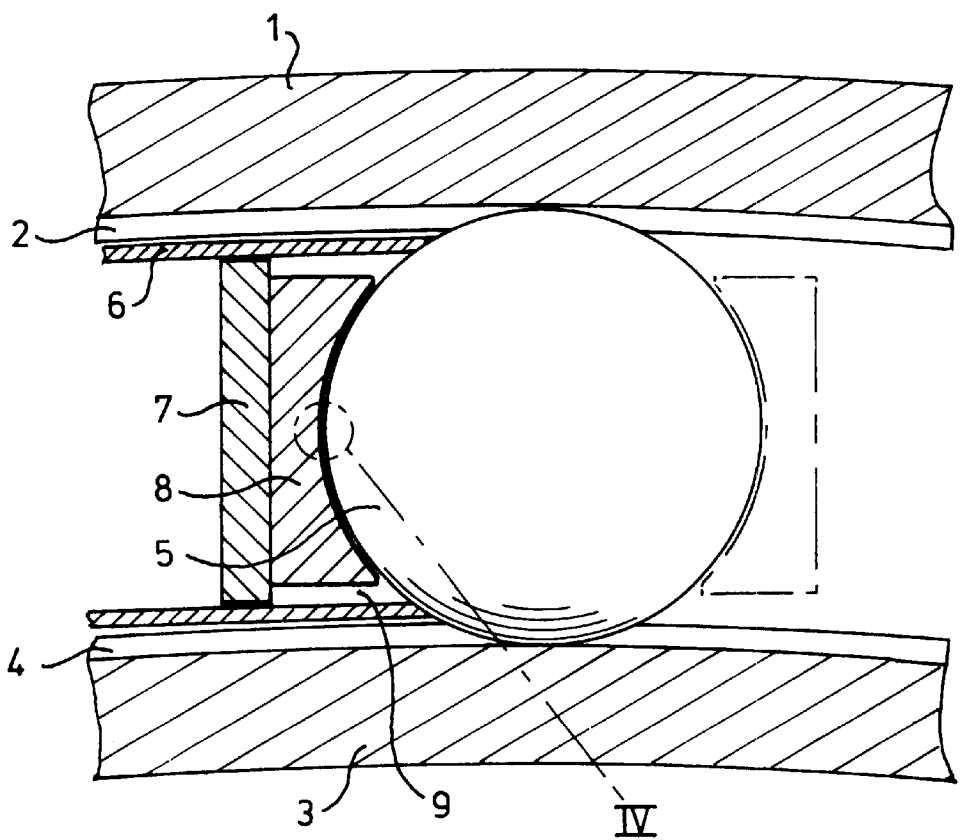
FIG. 1 shows a first side view of a cage with ball, in contact.

FIG. 1 shows a part of a ball bearing, having an outer ring 1 with raceway 2, an inner ring 3 with a raceway 4, balls 5 as well as a cage 6. The cage 6 has cage bars 7, which on both sides carry a porous element 8.

Between each pair of cage bars 7 with porous elements 8, a cage pocket 9 is defined.

Figure 2:
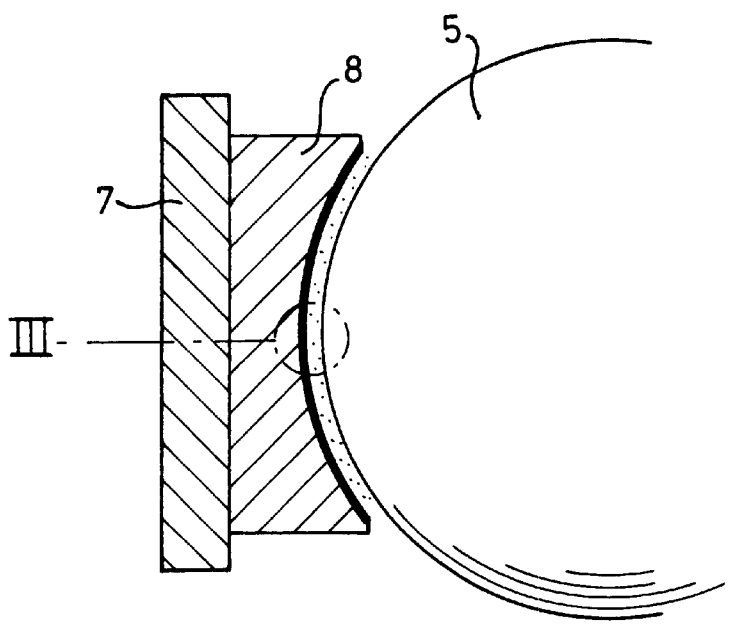
FIG. 2 shows a cage with ball which are not in contact.
Figure 3:
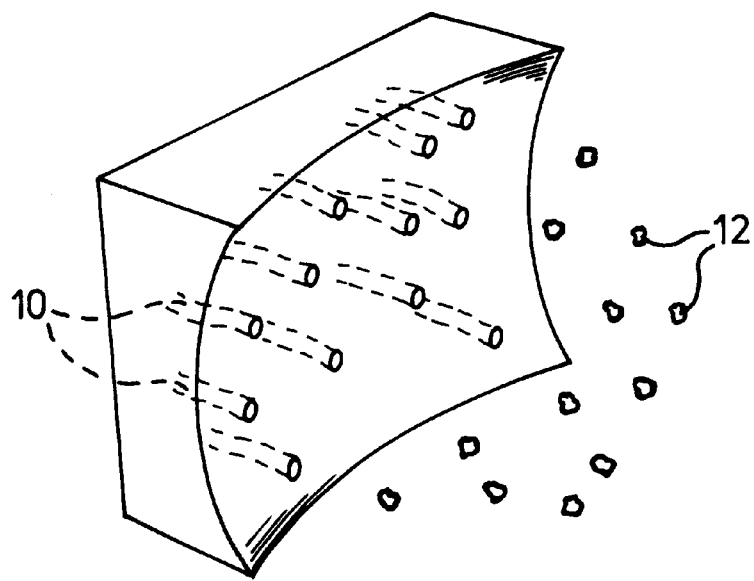
FIG. 3 shows an enlarged detail III of FIG. 1.

In service, the ball 5 frequently collides onto the porous elements 8 on both sides of its cage pocket 9, as shown in FIGS. 1 and 2. FIG. 1 shows that ball 5 in contact with porous element 8 in question, FIG. 2 shows the non-contact situation.

Figure 4:
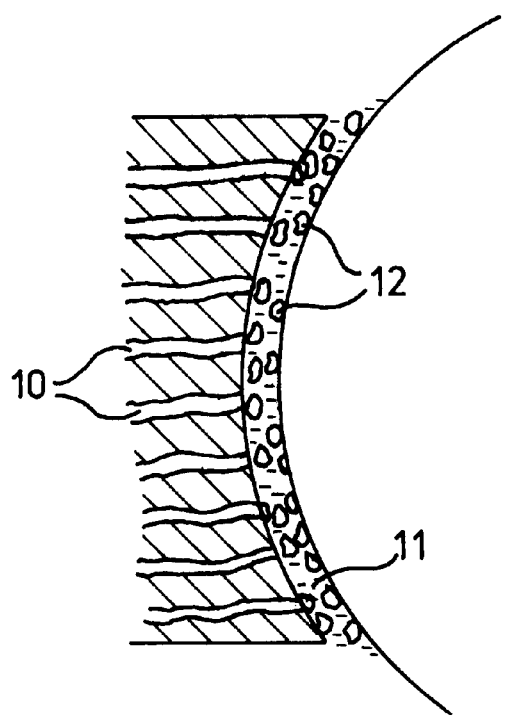
FIG. 4 shows an enlarged detail IV of FIG. 2.

As shown in FIG. 4, porous element 8 has pores 10. Furthermore, there is a lubricating liquid 11, which has dispersed therein particles 12. The sizes of the particles 12 are larger than the cross-sectional sizes of the pores 10. This means that the particles 12, which for instance are PTFE particles, cannot penetrate the pores 10.

Once a ball 5 comes in contact with porous element 8, the lubricating liquid 11 is compressed between these elements. As a result, the particles 12 are pressed onto the porous element 8 as well, in such a way that they block the pores 10.

The lubricating liquid thus cannot escape via the pores, and forms a lubricating squeeze film 11 which guarantees a proper lubricating action between ball 5 and porous element 8. However, as soon as the ball moves away somewhat from the porous element 8, as shown in FIG. 2, the pores 10 are released which means that any lubricating liquid which is contained in the pores 10 may emanate therefrom.

The particles 12 move away from the surface of the porous element 8, as they are dispersed in the lubricating liquid.

The advantage of the lubricating system described is that a fair amount of lubricating liquid is held available within the pores 10 of the porous element 8. After the ball 5 has moved away from the porous element 8, the lubricating liquid may emanate on the surface of the porous element 8, thus providing a quantity of lubricating liquid for the ball 5.

After collision between the ball 5 and the porous element 8, still a lubricant film or squeeze film can be maintained between these components, as at such instant the lubricating liquid cannot escape via the pores.

What is claimed is:

1. Lubrication system for mutually displaceable bodies of a mechanical device, said system comprising a porous element and a lubricating liquid comparing dispersed particles, the size of the pores of the porous element, and the size of the particles being selected such that the pores of the porous element become blocked by the particles contained in the lubricant liquid film in the area of contact of said porous element with one of the bodies, wherein the size of the particles is larger than the size of the pores.

2. Lubrication system for mutually displaceable bodies of a mechanical device, said system comprising a porous element and a lubricating liquid comprising dispersed particles, the size of the pores of the porous element, and the size of the particles being selected such that the pores of the porous element become blocked by the particles contained in the lubricant liquid film in the area of contact of said porous element with one of the bodies, wherein the lubrication liquid is an oil comprising PTFE particles.

3. Lubrication system for mutually displaceable bodies of a mechanical device, said system comprising a porous element and a lubricating liquid comprising dispersed particles, the size of the pores of the porous element, and the size of the particles being selected such that the pores of the porous element become blocked by the particles contained in the lubricant liquid film in the area of contact of said porous element with one of the bodies, wherein the effective pore size increases towards the contact area.

\* \* \* \* \*